Aug. 17, 1954     F. W. SIMPKIN     2,686,431
CHAIN

Filed July 16, 1952     2 Sheets-Sheet 1

Inventor
FRANCIS WALTER SIMPKIN,
By
Attorney

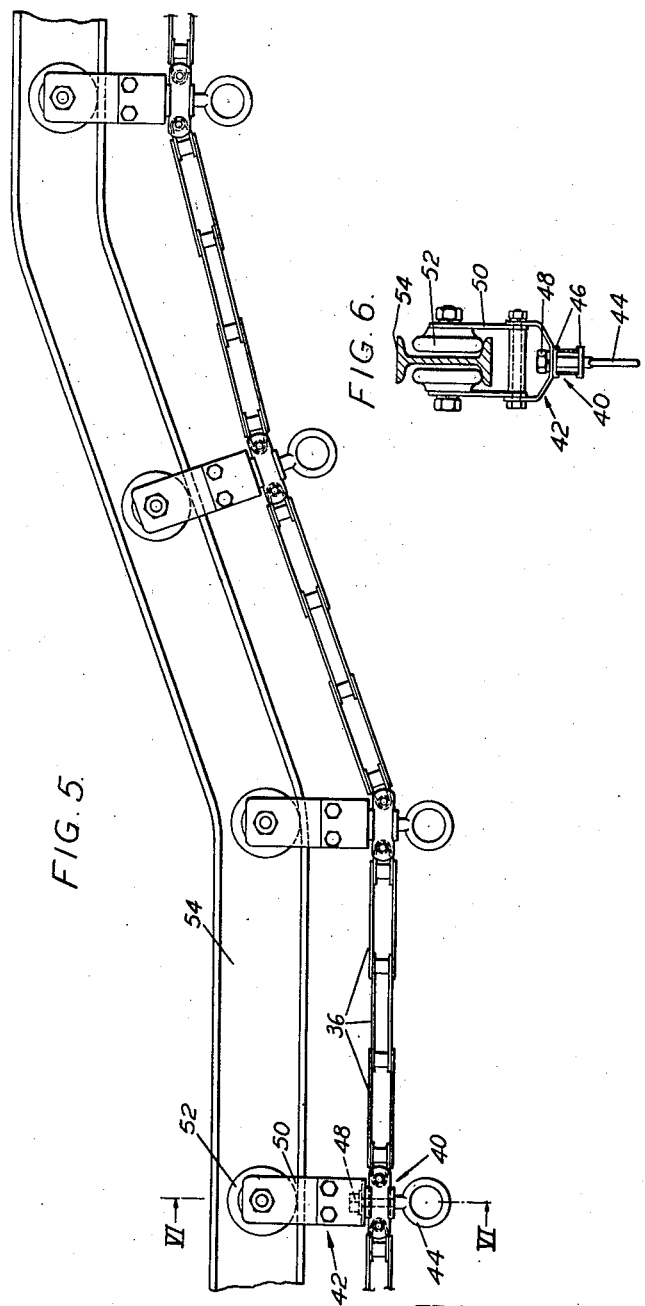

Patented Aug. 17, 1954

2,686,431

UNITED STATES PATENT OFFICE 2,686,431

CHAIN

Francis W. Simpkin, Heaton Mersey, Stockport, England, assignor to The Renold and Coventry Chain Company, Limited, Manchester, England Application July 16, 1952, Serial No. 299,301

2 Claims. (Cl. 74—246)

This invention relates to that kind of driving or conveying chain in which there are two parallel plates in each link, the plates in alternate links being spaced apart by a smaller distance than those in the others so that the links are alternately composed of inner and outer pairs of plates. The chain is thus composed essentially of pairs of overlapping plates. The plates of each inner pair are connected at each end by bushes and the plates of each outer pair by pins or rivets passing through the bushes of the inner pairs. The bushes joining the inner plates are commonly but not necessarily surrounded by rollers which make contact with the teeth of wheels over which the chain passes.

A chain of the kind in question commonly runs in only one plane, but sometimes may have to run in two planes. When it must do this, so-called bi-planar links are inserted in the chain at fixed intervals, that is to say, links which can turn about axes at right angles to those of the bushes; these links commonly include cast or machined shackle blocks, disposed between two plates which are perpendicular to the overlapping plates. Such shackle blocks are either inaccurate or expensive to manufacture. The chain wheels must, of course, be constructed to match the chains, i. e. teeth at spacings corresponding to those of the bi-planar links must be relieved, since otherwise the bi-planar links would foul them.

It is an object of this invention to provide bi-planar links which are simpler to manufacture than those hitherto used.

It is a further object to enable bi-planar links to be made accurately to given dimensions more readily than hitherto.

According to this invention the bi-planar links of a chain of the kind in question are each formed by two strips bent into a U, and a short chain link joining the two strips and composed of two short plates joined by pins or rivets. In each strip the arms are parallel and connected by a terminal bush which receives one pin or rivet of an adjacent standard link, while the throat of the U is semi-circular and engages one pin or rivet of the short link. The outer surface of the throat of the U is made of the same curvature as the bushes used in the standard links so that it will make proper and accurate engagement with the teeth of the chain wheels. It will be apparent that the pins or rivets of the short link are in a plane at right angles to a plane containing the axes of the bushes of the standard links. Each bi-planar link replaces a standard link (preferably one composed of inner pairs of plates), and the distance between the centres of the terminal bushes of the bi-planar link when this is fully extended is preferably equal to the pitch of a standard link so that the bi-planar link will run round a chain wheel which has no modification except that the teeth encountered by the bi-planar links are relieved.

If the chain is engaged by wheels in two planes at right angles, then the first wheel engages the standard links and is usually used to drive the chain, and the teeth of the second wheel are so spaced that they enter the short links of the bi-planar links and engage the throats of the U-shaped strips. This second wheel usually forms a guiding path for the chain to bend at right angles.

The invention is particularly applicable to chains of the kind described forming parts of overhead conveyors consisting of a number of carriers suspended from rollers running on a rail and driven by the chain. At all points on such a conveyor the chain lies directly beneath the rail, and at bends in a horizontal plane the chain runs round chain wheels, one or more of which may be driven to drive the conveyor. The plates of the standard links of the chain are horizontal in passing round these wheels, and the pins or rivets of the bi-planar links are horizontal at all times, even when the chain is running in a path inclined to the horizontal. It is most convenient to provide a bi-planar link at the point of attachment of each carrier to the chain.

The accompanying drawings show example of chains incorporating bi-planar links according to the present invention. In these drawings:

Figures 5 and 6 are an elevation of a conveyor, and a section on the line VI—VI in Figure 5.

Figure 1:
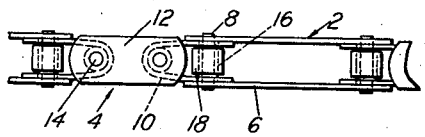
Figures 1 and 2 are an elevation and plan of a short length of chain on a large scale.
Figure 2:
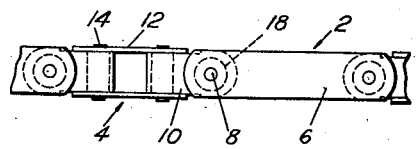

Figures 1 and 2 show a standard outer link 2 and a bi-planar link 4. The standard link 2 is made up of two side plates 6 joined together by two rivets 8. The bi-planar link 4 is formed of two strips 10 bent into a U, as shown in Figure 1, and a short link composed of two short plates 12 joined by two rivets 14. The arms of each strip 10 are joined by a bush 16 which surrounds one of the pins 8 and is in turn surrounded by a small roller 18.

Figure 3:
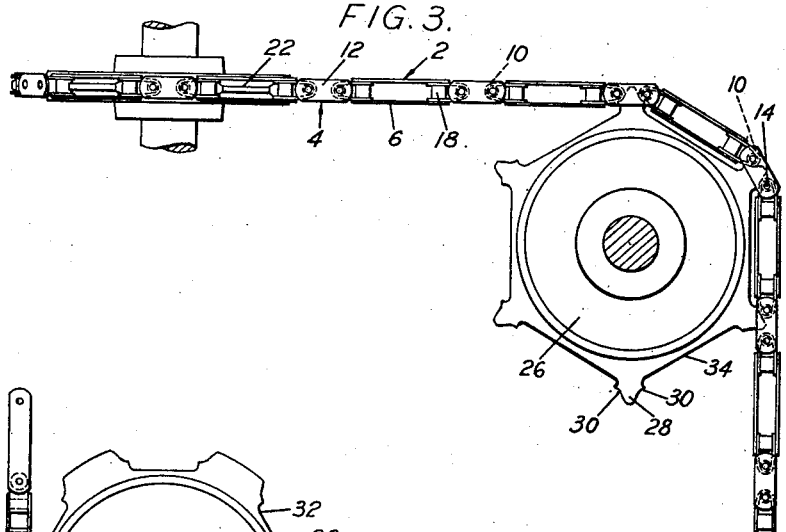
Figures 3 and 4 are an elevation and plan on a smaller scale of the same chain running round chain wheels in two planes.
Figure 4:
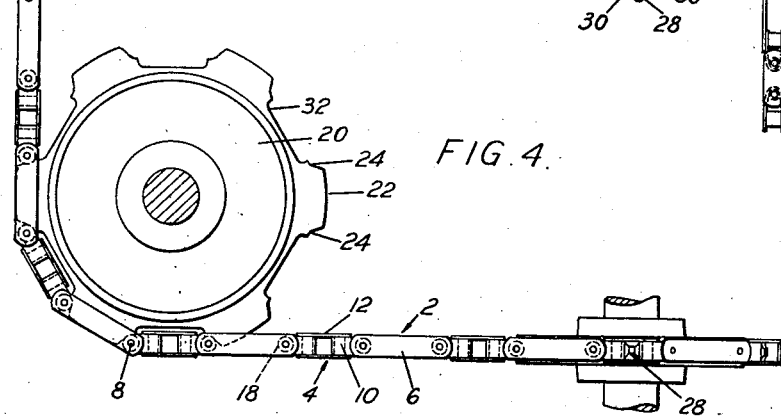

Figures 3 and 4 show how a chain made up as shown in Figures 1 and 2 can be run round chain wheels which guide the chain to flex in more than one plane. Figure 4 shows a chain wheel 20 having teeth 22 which enter the gap in a standard link and which have surfaces 24 which engage to rollers 18. In passing round the wheel 20 the chain flexes about the axes of the pins 8.

Figure 3 shows a chain wheel 26 having teeth 28 which enter the gaps in the short links of the bi-planar links and which have surfaces 30 which engage the outer strips 10. In passing round this wheel the chain flexes about the axes of the pins 14.

It will be seen that, between the teeth 22, the chain wheel 20 is cut away at 32 to clear the small links of the bi-planar links, while the chain wheel 26 is cut away at 34 to clear the standard links. It will be seen from Figure 2 that the distance between the axes of the bushes 16 of a biplanar link is the same as the distance between the axes of the rivets 8 of a standard link. That is to say that in passing round the wheel 20 the chain behaves as if formed of links all of the same pitch, whereas this is not so when the chain passes round the wheel 26. It is therefore preferable to drive the chain through the wheel 20 rather than the wheel 26.

Figures 5 and 6 show a chain conveyor in which three standard links 36, two outer and one inner, alternate with a bi-planar link 40. The standard links 36 are arranged with the axes of their rivets substantially vertical. A bracket 42 is secured to each bi-planar link. This bracket includes an eye bolt 44 which passes through the gap in the central link of the bi-planar link and carries clamping plates 46 which are tightened onto the central link by a nut 48. The bracket also comprises two upwardly extending arms 50 carrying rollers 52 which run on the lower flange of an I-sectioned rail 54. Loads can be hung on the eye bolts 44 and their weight is taken by the rail 54. This rail guides movement of the loads in a vertical plane, while the loads are guided round corners in a horizontal plane by chain wheels engaging the chain.

I claim:

1. A chain particularly adapted for use in conveyor systems having driving and guiding wheels rotatable on right angularly related axes, comprising, alternate standard and biplanar links, each of said links including side plates and pins retaining the ends of the side plates in spaced relation, bushings disposed on the pins of said standard links, and means interconnecting the standard and biplanar links whereby the respective side plates thereof are right angularly related, said means including U-shaped metallic strips, the throat of a U-shaped strip bearing against a pin of a biplanar link, the ends of the U-shaped strip rotatably mounted on a pin of a standard link, the bushing on said last-named pin extending between the arms of the U-shaped strip.

2. A chain as recited in claim 1 wherein the side plates of standard links and biplanar links are unequal in length and the distance between the end pins of a standard link is equal to the distance between the adjacent end pins of two spaced standard links when the chain is extended.

References Cited in the file of this patent

UNITED STATES PATENTS

| Number | Name | Date |
| --- | --- | --- |
| 393,490 | Stone | Nov. 27, 1888 |
| 1,037,001 | Harlan | Aug. 27, 1912 |
| 1,883,004 | Shafer, Jr. | Oct. 18, 1932 |
| 2,298,386 | Jennings | Oct. 13, 1942 |